Sept. 15, 1942.                L. MEYER                    2,295,961
                         PISTON LOCKING DEVICE
                        Filed Nov. 23, 1938           2 Sheets-Sheet 2
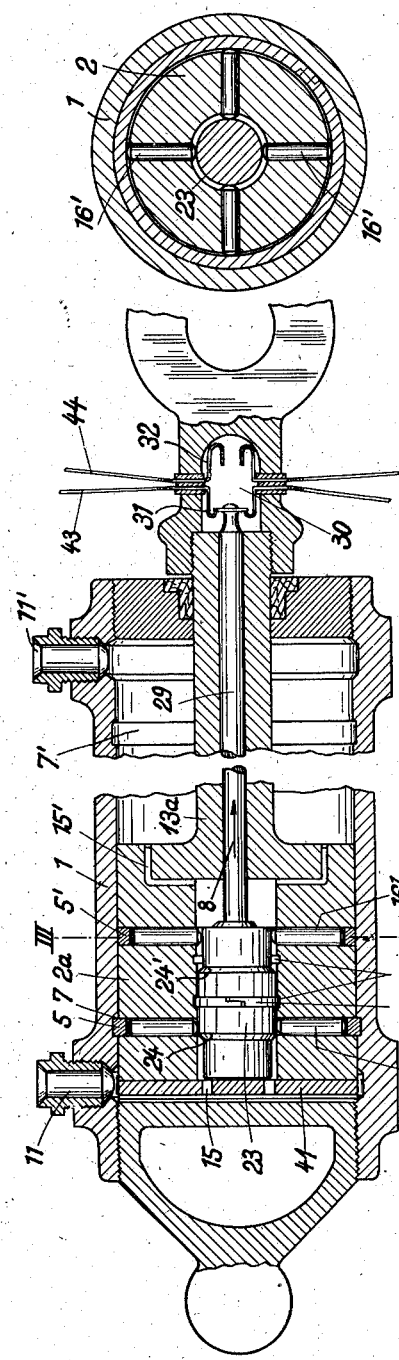
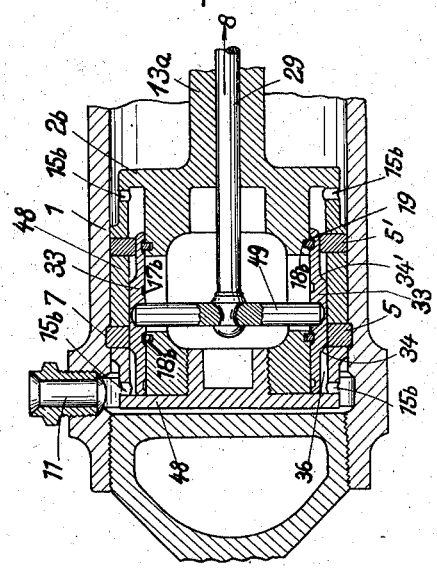
Inventor:
Ludwig Meyer
by Grant Baldwin
his Attorney.

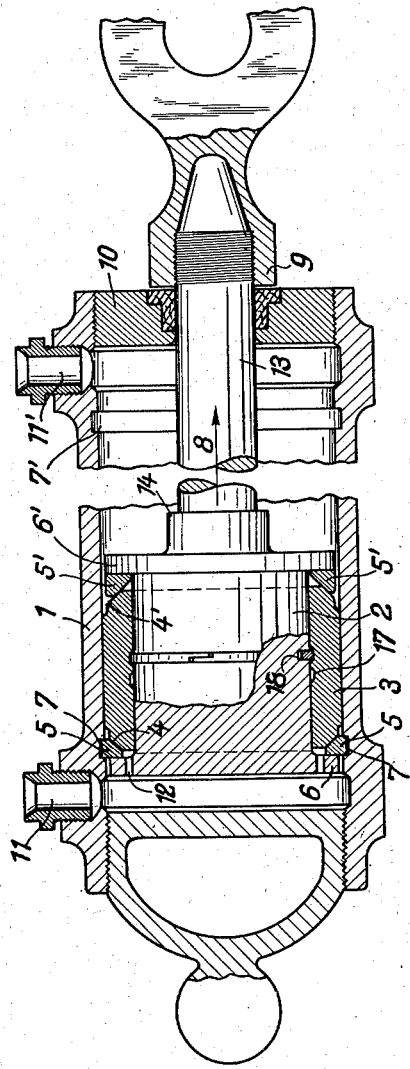

Patented Sept. 15, 1942

2,295,961

UNITED STATES PATENT OFFICE 2,295,961

PISTON LOCKING DEVICE

Ludwig Meyer, Dessau, Germany; vested in the Alien Property Custodian

Application November 23, 1938, Serial No. 242,049
In Germany November 26, 1937

14 Claims. (Cl. 121—40)

This invention relates to improvements in piston locking devices by which pistons may be securely held against accidental movement in their cylinders.

It is an object of the invention to provide a piston locking device which is efficient in operation, and which is operated both for locking and releasing the piston by the pressure medium by which the said piston is moved in its cylinder.

Another object of the invention is to provide a light and simple form of piston locking device which may be applied to cylinders and pistons to lock the latter at both extremities of their strokes without adding appreciably to the size or weight of the cylinders and pistons to which it is applied, thereby providing a mechanism of this nature which may be advantageously employed on landing gears of airplanes.

Another object of the invention is to provide a piston locking device comprising resilient locking rings associated with the piston which engage annular grooves formed in the cylinder wall, and actuating means for expanding the rings to engage the grooves and lock the piston.

Another object of the invention is to provide such a piston locking device wherein the actuating means for the locking rings is carried by the piston but is permitted limited axial movement relative to the latter so that the pressure by which the piston is moved towards the opposite end of its stroke first moves the actuating means, thereby permitting the ring in locking position to withdraw from its cylinder groove before movement of the piston commences.

Yet another object of the invention is to provide a piston locking device wherein the actuating means for expanding the locking rings may be made the desired size to exert the required amount of pressure upon the rings to expand them and force them into engagement with their grooves.

Having thus briefly stated some of the major objects and advantages of the invention I will now proceed to describe some of the preferred embodiments thereof, with the aid of the accompanying drawings, in which:

Figure 1 illustrates a longitudinal section of a cylinder and piston to which my invention is applied.

Figure 2 is a longitudinal section of a cylinder and piston to which a somewhat modified form of the invention is applied.

Figure 3 is a section on the line 3—3 of Figure 2.

Figure 4 is a partial longitudinal section showing a cylinder and a piston therein to which a further modification of the invention is applied.

Referring first to Figure 1. I designates a cylinder having annular grooves 7 and 7' formed therein one adjacent each extremity. A piston 2 is mounted for reciprocation in the cylinder 1 and is provided with outwardly disposed annular flanges 6 and 6' one around each extremity; the diameter of these flanges however is preferably less than the bore of the cylinder. Mounted around the piston 2 between the flanges 6 and 6' is an auxiliary piston 3, the length of which is less than the distance between the said flanges. Between the latter and the adjacent extremities 4 and 4' of the auxiliary piston 3 resilient locking rings 5 and 5' respectively are provided. These rings 5 and 5' are so formed that they tend to spring inwardly so that their diameters are normally less than the bore of the cylinder 1. The cooperating faces of the flanges 6 and 6' and the rings 5 and 5' are disposed at right angles to the axis of the piston 2, and the lockings 5 and 5' are of such width as to slide freely into the annular cylinder grooves 7 and 7' respectively when expanded. The adjacent faces of the rings 5 and 5' and the coacting extremities 4 and 4' of the auxiliary piston 3 are tapered so that axial movement of the latter against one of the rings expands the latter and tends to move it into engagement with its cylinder groove. Extending from the piston 2 is a rod 13 which extends through the cylinder cover 10 and is provided with an enlargement 14 thereon adjacent the piston to contact the said cover and limit the movement of the piston and rod in one direction; and mounted around the piston rod 13 externally of the cylinder is a stop 9 which is adapted to contact the cover 10 and limit the stroke of the piston in the opposite direction. The purpose of these stops is to arrest the piston when one of the rings, 5 or 5', is opposite its cylinder groove 7 or 7'.

Formed through the flanges 6 and 6', inwardly of the rings 5 and 5' when they are expanded, are apertures as shown at 12. 11 and 11' denote ports provided at opposite extremities of the cylinder 1. The piston 2 substantially centrally of its length is annularly grooved to receive a piston ring 18, and formed in the bore of the auxiliary piston 3 are ring grooves 17. The ring 18 is engaged by the groove 17 remote from the locking member 5 or 5' in engagement with its cylinder groove. To facilitate engagement and disengagement of the ring 18 with the grooves 17 the sides of the latter and of the ring are suitably tapered.

The operation of the device is briefly as follows: When pressure (either liquid or fluid) admitted through the port 11' has moved the piston 2 to the left end of its stroke, which is limited by the stop 9, the locking ring 5 is opposite the cylinder groove 7. Then the continued action of the pressure within the cylinder moves the auxiliary piston 3 to the left and the tapered face 4 of the latter forces the ring 5 into its expanded groove engaging position shown. During this axial movement of the auxiliary piston 3 the ring 5' has sprung inwardly from the cylinder wall and remained in contact with the tapered face 4' of the said auxiliary piston 3.

When pressure is admitted through the port 11 it passes through the apertures 12 and moves the auxiliary piston 3 in the direction of the arrow 8 thereby permitting the locking ring 5 to contract and withdraw from the groove 7, after which continued pressure moves the piston 2 to the right and when it reaches the opposite extremity of its stroke the locking ring 5' engages the cylinder groove 7'.

It will further be noted that in this arrangement the locking rings 5 and 5' and the auxiliary piston 3 may be so proportioned that by the time one of the rings has contracted sufficiently to disengage its cylinder groove and permit axial movement of the piston 2 the other ring has been expanded sufficiently to bear against the cylinder wall. Thus both the locking rings 5 and 5' may also function as piston rings during the movement of the piston 2, and in any case the pressure medium acting against one end of the auxiliary piston 3 causes the ring 5 or 5' remote therefrom to be held in intimate contact with the bore of the cylinder. The purpose of the ring 18 and the grooves 17 is to prevent the locked ring, 5 or 5', contracting and moving the auxiliary piston 3 axially in the event of failure of the pressure medium against the opposite end of the piston 2.

In the arrangement shown in Figures 2 and 3, the piston 2a, mounted for reciprocation in the cylinder 1, is of uniform diameter throughout its length, and is provided with annular grooves to receive the resilient locking rings 5 and 5' which are again adapted to engage grooves 7 and 7' respectively formed in the cylinder wall.

The piston 2a is concentrically bored for a portion of its length to receive an auxiliary piston 23, which is permitted limited axial movement therein between the base of the piston bore and a plate 41 suitably mounted over the open extremity of the said bored portion. 15 and 15' denote apertures formed through the plate 41 and the opposite extremity of the piston 2a respectively to permit entry of the pressure medium from within the cylinder into opposite ends of the piston bore to operate against opposite extremities of the auxiliary piston 23. The latter is of reduced diameter at its extremities and of enlarged diameter to fit the bore of the piston 2a centrally of its length. Between the central portion of enlarged diameter and the extremities of smaller diameter annular tapered faces 24 and 24' are formed around the auxiliary piston 23. A piston ring 18' is also mounted in a ring groove around the auxiliary piston 23 to engage either of two ring grooves 17' formed in the bore of the piston 2a. These grooves 17' are so positioned that the ring 18' engages one of them at each extremity of the stroke of the auxiliary piston 23 in the piston 2a.

Extending through radial apertures formed in the piston 2a in alignment with the locking rings 5 and 5' are pins 16 and 16' respectively, each of which latter bears at one extremity against one of the said rings and at its other extremity against the periphery of the auxiliary piston 23.

The operation is as follows: When the locking ring 5 is in engagement with the cylinder groove 7 and the piston 2a is to be moved the pressure medium flows into the port 11 and through the apertures 15. The pressure medium then moves the auxiliary piston 23 so that the adjacent extremity of the latter of reduced diameter moves beneath the pins 16. Then the ring 5 contracts and withdraws from the cylinder groove 7, after which the piston 2a is free to be moved by the pressure medium axially in the direction of the arrow 8. When it is desired to move the piston 2a in the opposite direction the pressure medium is introduced through the port 11'. In either case as the piston 2a reaches the end of its stroke the pins 16, or 16', travel outward by contact with the tapered face 24, or 24', of the auxiliary piston movement of which is permitted as soon as the ring 5, or 5' is positioned opposite its groove 7, or 7'. This tendency to move one of the locking rings outward during the travel of the piston 2a in the cylinder merely forces that locking ring, which may then function as a piston ring, into more intimate contact with the cylinder wall.

In this arrangement the piston rod 13a is shown tubular for the passage of an axially movable member 29 therethrough. Mounted upon the outer extremity of the piston rod 13a is a hollow connection 30 having spaced contacts 31 and 32 therein. Extending from the connection 30 and insulated therefrom are electric leads 43 and 44 one of which is connected to each of the contacts 31 and 32 respectively. As the auxiliary piston 23 reaches each extremity of its travel a contact carried upon the outer extremity of the member 29 closes a circuit through one of the contacts 31 or 32. Thus provision is made for providing a visual signal to indicate that the piston 2a is locked at one extremity of the cylinder, and at which end positioned it is locked.

In the modified construction shown in Figure 4, the piston 2b is provided with a concentric annular recess 36, and is also transversely slotted inwardly of the recess intermediately of its length. The front extremity of the recess 36 is closed by a cover 48 which is suitably mounted upon the piston 2b. Mounted for limited axial movement in the annular recess between its inner extremity and the cover 48 is an auxiliary piston 33. Extending through annular slots formed in that portion of the piston 2b outwardly of the said recess are locking rings 5 and 5' the former of which is shown in engagement with its cylinder groove 7. The annular slots wherein the locking rings 5 and 5' are radially movable sever the central portion 2c of the piston between the said rings and outwardly of the recess around its entire circumference. This central portion 2c is supported for axial movement with the main body of the piston 2b and the rings 5 and 5' between the wall of the cylinder 1 and a central portion of enlarged diameter of the auxiliary piston 33 against which the rings 5 and 5' bear when expanded. The bore of the auxiliary piston 33 is of uniform diameter throughout its length to bear against the inner annular wall of the said recess 36 and to be axially slidable thereon. Both extremities of the outer periphery of the auxiliary piston 33 are of reduced diameter and are connected to its central portion of enlarged diameter by annular inclined faces 34 and 34' by each of which one of the locking rings 5 and 5' is adapted to be expanded when the auxiliary piston is moved axially.

The ends of the piston 2b are preferably of reduced diameter and have apertures 15b formed therethrough to permit a flow of the pressure medium from the cylinder 1 to adjacent extremities of the auxiliary piston in the annular recess 36. When liquid or fluid pressure flows under pressure through the port 11 into the cylinder 1 it passes through the adjacent apertures 15b and moves the piston 33 so that its adjacent extremity of reduced diameter is positioned beneath the locking ring 5. The latter then contracts and withdraws from the cylinder groove 7, after which continued introduction of the pressure medium into the cylinder moves the piston 2b in the direction of the arrow 8 until the locking ring 5' has been expanded by the inclined face 34' which can only occur when that locking ring is in registry with its groove (not shown).

Rings 18b are, in this instance, mounted in grooves formed around the inner periphery of the recess 36 to engage corresponding grooves 17b formed in the bore of the auxiliary piston 33 at both ends of the travel of the latter.

The piston rod 13a is again tubular to permit movement of a member 29 therethrough. Extending transversely to the member 29 is a connecting element 49 the extremities of which are secured to the auxiliary piston 33, this element is also secured to the member 29 so that axial movement is imparted to the latter by movement of the auxiliary piston.

What I claim is:

1. A locking device for movable members, adapted to extend varying longitudinal distances comprising, in combination, a cylinder, a main piston therein adapted to be moved in either direction by fluid pressure, an auxiliary piston carried by the main piston and having a limited axial movement relative thereto, a pair of annular grooves formed in separated sections of the wall of the cylinder, a pair of resilient expandible rings carried by the main piston normally having a diameter less than the diameter of the cylinder so that they may be moved with the main piston through the cylinder, said auxiliary piston provided with two annular tapered faces, one for each ring, inclined opposite to one another and adapted upon movement of the auxiliary piston relative to the main piston toward their respective ring to exert a gradually increasing force tending to expand the ring and further adapted when the main piston has been moved to a predetermined position opposite one of the grooves in the cylinder to expand the ring thereinto and lock the piston assembly against movement, said tapered faces being so disposed that when the auxiliary piston is in an intermediate position of its movement both rings are free to contract to a diameter less than that of the cylinder.

2. A locking device for movable members adapted to extend varying longitudinal distances comprising, in combination, a cylinder having an annular groove in the wall thereof, a main piston in the cylinder adapted to be moved in either direction by fluid pressure, a resilient expandible locking ring carried by said main piston normally self contractible to diameter less than that of the cylinder but expandible into the groove in the wall of the cylinder when opposite thereto, an auxiliary piston carried by said main piston movable relative thereto and provided with two outer annular faces, one of which inclines toward the axis of the cylinder and the other of which extends from the outer edge of the inclined face substantially parallel to the axis of the cylinder, said inclined face adapted upon movement of the auxiliary piston relative to the main piston in one direction to first exert a force on the ring tending to expand the same and when the latter is opposite the groove in the cylinder wall to expand the same thereinto to lock the piston assembly against movement, said substantially parallel face adapted to then receive the contracting force of the ring and hold the same in expanded locking position.

3. A piston locking device comprising a cylinder having spaced annular grooves formed therein, a main piston in the cylinder adapted to be moved in either direction by fluid pressure, said main piston provided with a pair of annular grooves around its outer periphery, a resilient split ring of variable diameter in each of said annular grooves on the periphery of the main piston, an auxiliary piston carried by the main piston and mounted for limited reciprocal movement thereon, said auxiliary piston shaped with camming faces so disposed that when shifted to either of the extreme portions of its movement it will exert a force on either one or the other of said rings tending to expand the same and when the main piston is in a position opposite one of the grooves in the cylinder will expand the ring thus influenced from its groove on the piston into the groove on the cylinder and lock the main piston against movement.

4. A locking device for movable members adapted to extend varying longitudinal distances comprising, in combination, a cylinder having an annular groove in the wall thereof, a piston reciprocable in the cylinder and having an annular groove around its outer periphery, a resilient split ring of variable diameter disposed in the annular groove of the piston and being self contractible to a diameter less than that of the cylinder, said ring having a radial thickness greater than the depth of the annular groove in the wall of the cylinder so that when expanded fully thereinto the inner marginal portion will remain in the annular groove of the piston locking the piston against movement, and a circular member coaxially arranged in said cylinder and so mounted that the piston and the member are movable relative to one another, said member having an annular tapered face adapted when relative movement of the piston and members occurs in one direction to exert a force tending to expand the ring and when the said two grooves are opposite one another to expand the ring in locking engagement with the groove in the cylinder wall.

5. A piston locking device comprising a cylinder having an annular groove formed therein, a piston mounted for axial movement in the cylinder, a resilient locking ring carried by the piston adapted to engage said groove and lock the piston, means carried by the piston and permitted limited movement relative thereto operable to change the diameter of said resilient ring to thereby move it into the cylinder groove, means in said cylinder whereby a pressure medium admitted thereinto is operable to actuate said piston-carried means, a tubular piston rod extending from the piston, and a member axially movable through said rod, said member being rigidly connected to the piston-carried means and adapted to indicate the position of said means relative to the piston.

6. A piston locking device comprising a cylinder having annular grooves formed therein, a piston mounted for axial movement in the cylinder, spaced resilient rings mounted around the main piston each adapted to engage one of the cylinder grooves and hold the piston immovable, means on the piston limiting the outward axial movement of the rings, an auxiliary piston axially movable around the main piston between the rings, coacting tapered faces formed around the rings and the adjacent extremities of the auxiliary piston whereby axial movement of the latter varies the diameter of said rings, and means through which a pressure medium is adapted to flow into each extremity of the cylinder to exert pressure against said main and auxiliary pistons.

7. In a piston locking device, the combination set forth in claim 6 wherein the coacting tapered faces formed around the rings and the auxiliary piston are adapted to expand the rings when pressure is exerted against them by the auxiliary piston, said rings being adapted to contract and withdraw from their grooves.

8. In a piston locking device, the combination set forth in claim 6, wherein means coacting with the main piston and the auxiliary piston are provided adapted to retain the auxiliary piston against accidental movement at either end of its stroke.

9. In a piston locking device, the combination set forth in claim 6, wherein means are provided for preventing further movement of the main piston when each locking ring is in position to engage its cylinder groove.

10. A piston locking device comprising a cylinder having annular grooves formed therein, a main piston mounted for axial movement in the cylinder and having annular flanges around its extremities, an auxiliary piston around the main piston mounted for axial movement between the flanges, two resilient locking rings around the main piston one between each flange and the adjacent extremity of the auxiliary piston, each locking ring being adapted to engage one cylinder groove and hold the piston immovable, said auxiliary piston and said locking rings having coacting tapered faces whereby axial movement of the auxiliary piston in each direction expands one of the rings, each ring being adapted to contract when said auxiliary piston moves axially therefrom, and means permitting a flow of a pressure medium into each extremity of the cylinder and to flow from each extremity of the cylinder to the adjacent extremity of the auxiliary piston to actuate the latter in all positions of the locking rings.

11. A piston locking device comprising a cylinder having an annular groove formed therein, adjacent each extremity, a main piston mounted for axial movement in the cylinder having a concentric recess formed therein, locking rings carried around the periphery of the main piston adapted to be expanded to engage the cylinder grooves, pins extending radially through openings formed in the main piston from said recess to the inner periphery of said rings, an auxiliary piston in said recess of the main piston and movable a limited distance relative thereto, said auxiliary piston having two oppositely tapered annular faces formed around its periphery adapted to engage said pins and force them radially outward to expand said rings, and means permitting the passage of a pressure medium from each end of the cylinder to the adjacent extremity of the auxiliary piston.

12. A piston locking device comprising the combination set forth in claim 11, wherein a tubular piston rod extends from the main piston, and a member extending from the auxiliary piston through said rod adapted to actuate an indicating means.

13. A piston locking device comprising a cylinder having annular grooves formed therein, a main piston mounted for axial movement in said cylinder having an annular recess formed therein from one extremity, an auxiliary piston in said recess having annular tapered faces around its periphery, resilient locking rings mounted outwardly of the auxiliary piston adapted to be expanded by said tapered faces to engage said cylinder grooves upon axial movement of the auxiliary piston, means retaining said auxiliary piston in said recess, means retaining said rings in spaced axial relation, and means permitting the passage of a pressure medium from each extremity of the cylinder into the adjacent end of the recess.

14. A piston locking device comprising the combination set forth in claim 13, wherein the main piston is transversely slotted, a tubular piston rod extending from the main piston, a member mounted for axial movement through said rod, and means extending through said slot rigidly connecting the auxiliary piston with said member.

LUDWIG MEYER.